(12) United States Patent
Kaijala (10) Patent No.: US 10,175,712 B2
(45) Date of Patent: Jan. 8, 2019

(54) COMPACT VEHICLE PEDAL (71) Applicant: CTS Corporation, Elkhart, IN (US)

(72) Inventor: Murray Kaijala, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 15/152,051

(22) Filed: May 11, 2016

(65) Prior Publication Data

US 2016/0334829 A1 Nov. 17, 2016

Related U.S. Application Data

(60) Provisional application No. 62/162,768, filed on May 17, 2015.

(51) Int. Cl.

| | |
|---|---|
| *G05G 1/38* | (2008.04) |
| *B60K 26/02* | (2006.01) |
| *B60K 26/04* | (2006.01) |
| *B60T 7/04* | (2006.01) |
| *G05G 1/44* | (2008.04) |
| *G05G 5/05* | (2006.01) |
| *G05G 1/30* | (2008.04) |
| *G05G 1/50* | (2008.04) |
| *G05G 9/047* | (2006.01) |

(52) U.S. Cl.
CPC .............. *G05G 1/38* (2013.01); *B60K 26/02* (2013.01); *B60K 26/04* (2013.01); *B60T 7/042* (2013.01); *G05G 1/30* (2013.01); *G05G 1/44* (2013.01); *G05G 1/50* (2013.01); *G05G 5/05* (2013.01); *G05G 9/04792* (2013.01); *B60K 2026/046* (2013.01)

(58) Field of Classification Search
CPC ... G05G 1/38; G05G 1/30; G05G 1/44; B60K 26/02; B60K 26/04; B60T 7/042
See application file for complete search history.

(56) References Cited

U.S. PATENT DOCUMENTS 5,416,295 A * 5/1995 White ..................... G05G 1/38
200/61.89
2002/0175676 A1* 11/2002 Pfaffenberger ....... F02D 11/106
324/207.2

(Continued)

FOREIGN PATENT DOCUMENTS

| DE | 10341277 A1 | 3/2005 |
|---|---|---|
| EP | 1106416 A1 | 6/2001 |

(Continued)

*Primary Examiner* — Vicky A Johnson
(74) *Attorney, Agent, or Firm* — Daniel Deneufbourg (57) ABSTRACT

A vehicle pedal with a pedal base defining a sensor housing and a pedal arm overlying and spaced from and pivotally coupled to the pedal base. A sensor in the sensor housing includes a sensor element that moves in the direction of the pedal base in response to the movement of the pedal arm to generate an electrical signal used to determine to position of the pedal arm. In one embodiment, the sensor includes a strain gage and the sensor element is an actuator that flexes the strain gage. In another embodiment, the sensor includes a Hall Effect sensor and the sensor element is a magnet whose movement results in a magnetic field change sensed by the Hall Effect sensor. In a further embodiment, the sensor element is a cap with wipers that slide against a resistive element.

8 Claims, 7 Drawing Sheets

(56) References Cited

U.S. PATENT DOCUMENTS

| | | | |
|---|---|---|---|
| 2003/0070503 A1* | 4/2003 | Menzies | G05G 1/38 |
| | | | 74/513 |
| 2004/0237700 A1 | 12/2004 | Wurn | |
| 2005/0217414 A1 | 10/2005 | Gibson | |
| 2007/0137400 A1 | 6/2007 | Campbell | |
| 2007/0193401 A1* | 8/2007 | Campbell | B60K 26/02 |
| | | | 74/560 |
| 2008/0276749 A1 | 11/2008 | Stewart et al. | |
| 2010/0206122 A1 | 8/2010 | Seiltz | |
| 2011/0162481 A1 | 7/2011 | Campbell | |

FOREIGN PATENT DOCUMENTS

| | | |
|---|---|---|
| EP | 1936470 A1 | 6/2008 |
| JP | 2008232625 A | 10/2008 |

* cited by examiner

COMPACT VEHICLE PEDAL

CROSS-REFERENCE TO RELATED AND CO-PENDING APPLICATIONS

This patent application claims the benefit of the filing date and disclosure of U.S. Provisional Patent Application Ser. No. 62/162,768 filed on May 17, 2015, the contents of which are incorporated herein by reference as are all references cited therein.

FIELD OF THE INVENTION

The present invention relates generally to a vehicle pedal and, more specifically to a vehicle accelerator or brake pedal.

BACKGROUND OF THE INVENTION

Vehicle pedals including for example vehicle accelerator pedals with contacting and non-contacting assemblies for sensing the position of the vehicle pedal are well known in the art.

The present invention is directed to a compact and light-weight vehicle pedal adapted to be fitted within a smaller vehicle floor space and incorporating a compact pedal arm and a compact pedal base adapted to incorporate and house compact contacting and non-contacting assemblies for sensing the position of the vehicle pedal.

SUMMARY OF THE INVENTION

The present invention is generally directed to a vehicle pedal comprising a pedal base including opposed first and second ends and a sensor housing, a pedal arm overlying and spaced from the pedal base and including opposed first and second ends, the first end of the pedal arm being coupled to the first end of the pedal base and the pedal arm being pivotable about and relative to the pedal base, and a sensor located in the sensor housing in the pedal base, the sensor including a sensor element that is moveable in the direction of the pedal base in response to the pivotable movement of the pedal arm in the direction of the pedal base.

In one embodiment, the sensor additionally comprises a strain gage located in the sensor housing in the pedal base, a moveable actuator defining the moveable sensor element, the actuator being located between the strain gage and the pedal arm and abutting against the strain gage, and a bias spring located between the actuator and the pedal arm, the spring including a first end abutting against the actuator and a second opposed end abutted against the pedal arm, wherein the pivotal movement of the pedal arm in the direction of the pedal base causes the spring to exert a force against the actuator which causes the flexing of the strain gage and the generation of an electrical signal for determining the position of the pedal arm.

In one embodiment, the actuator includes a radial shoulder, the first end of the spring surrounding the actuator and abutted against the radial shoulder.

In one embodiment, the pedal further comprises a circuit board located in the sensor housing in the pedal base and first electrical terminals extend between the strain gage and the substrate and second electrical terminals extend between the substrate and an electrical connector.

In one embodiment, the actuator includes a projection extending into an aperture defined in the strain gage.

In one embodiment, a return spring has a first end abutted against the pedal arm and a second opposed end abutted against the pedal base and adapted for returning the pedal arm to an idle position, the return spring being located between and spaced from the first end of the pedal base and the sensor.

In another embodiment, the sensor additionally comprises a Hall Effect sensor located in the sensor housing in the pedal base, and a moveable magnet defining the moveable sensor element and coupled to the pedal arm, wherein the pivotal movement of the pedal arm in the direction of the pedal base causes the movement of the magnet in the direction of the pedal base and a change in the magnitude and/or direction of the magnetic field generated by the magnet that is sensed by the Hall Effect sensor and adapted to generate an electrical signal for determining the position of the pedal arm.

In one embodiment, the magnet includes a base and a pair of spaced apart arms together defining an interior gap in the magnet, the Hall Effect sensor extending in the gap in the magnet.

In one embodiment, a return spring has a first end abutted against the pedal arm and a second opposed end abutted against the pedal base and adapted for returning the pedal arm to an idle position, the return spring being located between and spaced from the first end of the pedal base and the sensor.

In a further embodiment, the sensor further comprises a resistive element located in the sensor housing in the pedal base, a moveable drive arm comprising the moveable sensor element, the moveable drive arm including a wiper in abutting contact with the resistive element, wherein the pivotal movement of the pedal arm in the direction of the pedal base causes the movement of the drive arm in the direction of the pedal arm which causes the wiper to slide against the resistive element and generate an electrical signal for determining the position of the pedal arm.

In one embodiment, a spring is located between the pedal base and the drive arm.

In one embodiment, the drive arm is a cap seated against a first end of the spring, the cap being located between the spring and the pedal arm and abutting the pedal arm.

The present invention is also directed to a vehicle pedal comprising a pedal base defining a sensor housing, the pedal base including opposed first and second ends, a pedal base clip element at the first end of the pedal base and a connector at the second end of the pedal base, the sensor housing being located between and spaced from the pedal base clip element and the connector, a pedal arm opposed and spaced from the pedal base, the pedal arm including opposed first and second ends, a pedal arm clip element at the first end of the pedal arm coupled to the pedal base clip element for pivotally mounting the pedal arm for movement in the direction of the pedal base; and a sensor located in the sensor housing, the sensor including a sensor element that is moveable in the direction of the pedal base in response to the pivotal movement of the pedal arm in the direction of the pedal base.

In one embodiment, the pedal base clip element is an elongate rod and the pedal arm clip element receives and is pivotable about and relative to the elongate rod.

In one embodiment, respective second pedal base and pedal arm clip elements at the respective second ends of the pedal base and the pedal arm for clipping the pedal arm to the pedal base at the respective second ends of the pedal base and the pedal arm.

In one embodiment, a return spring is located between the pedal base and the pedal arm, the return spring being located between and spaced from the respective first ends of the pedal base and the pedal arm and the sensor.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENTS

The FIGURES depict three embodiments of a vehicle pedal in accordance with the present invention which is in the form of a vehicle floor hinge design compact vehicle pedal which is shown in the FIGURES for use as a vehicle accelerator pedal but which may also additionally be used in another application as a vehicle brake pedal.

FIGS. 1, 2, 3, and 4 depict a first embodiment of a compact vehicle pedal 10 in accordance with the present invention that comprises a compact, elongated and generally flat pedal base 12 and a compact, elongated and generally flat pedal arm 14 pivotally mounted to the pedal base 12. Both the pedal base 12 and the pedal arm 14 may be made of a suitable molded thermoplastic material.

The pedal base 12 includes opposed upper/top and lower/bottom exterior longitudinally extending surfaces or faces 16 and 18. A pedal arm pivot 17 extends generally normally unitarily outwardly from the top surface 16 of the pedal base 12. The pedal arm pivot 17 is located at a first end of the pedal base 12 and, in the embodiment shown, includes and is in the shape and form of an elongated generally cylindrically shaped rod 19 that extends across the width of the pedal base 12 along the first end of the pedal base 12. A generally L-shaped clip 20 for clipping the pedal 10 to the vehicle floor (not shown) extends unitarily outwardly and inwardly from the bottom surface 18 of the pedal base 12 and, more specifically unitarily outwardly and inwardly from the first end of the pedal base 12, in a relationship diametrically opposed to the pedal pivot 17 on the top surface 16 of the pedal base 12.

A bracket 21 for securing the pedal 10 to the vehicle floor (not shown) extends unitarily outwardly from a second end (not shown) of the pedal base 12 opposite the first end of the pedal base 12 with the pivot 17 and the clip 20. The bracket 21 defines a through-hole or aperture 23 adapted to receive a mounting bolt (not shown) for securing the pedal 10 to the floor (not shown) of the vehicle (not shown) following the clipping of the pedal base 12 to the floor of the vehicle (not shown).

An electrical connector 22 also extends unitarily outwardly from the top surface 16 of the pedal base 12 and, more specifically, from the second end of the pedal base 12, in the embodiment shown, the connector 22 is located at the same second end of the pedal base 12 as the mounting bracket 21 and at the second end of the pedal base 12 opposite the first end with the pivot 17 and the clip 20. A plurality of electrical terminals 57 extend through the interior housing of the connector 22.

The pedal base 12 further includes a neck or collar 25 defined by a circumferential wall 27 extending unitarily normally outwardly from the exterior top surface 16 of the pedal base 12. The neck or collar 25 is generally located centrally on the top surface 16 of the pedal 12 between and spaced from the pivot 17 at one end of the pedal base 12 and the electrical connector 22 at the other end of the pedal base 12. A front portion 27a of the circumferential wall 27 located opposite and spaced from the connector 22 includes a clip finger 27b extending unitarily outwardly from the exterior surface thereof.

A pair of interior receptacles or openings or cavities or housings 23 and 29 are located in the interior of the neck or collar 25 and, more specifically, are defined in and extend from the top surface 16 and into the interior of the body of the pedal base 12. The pedal base housings or receptacles 23 are 29 are positioned in a side-by-side and spaced relationship with the receptacle 23 being generally cylindrical in shape and the receptacle 29 being generally rectangular in shape and defining an interior platform or floor 31 in the interior of the pedal base 12 that defines a through-hole opening 31a. The platform 31 extends generally horizontally in a relationship spaced and generally parallel to the opposed exterior longitudinal surfaces 16 and 18 of the pedal base 12 and in the same direction as the central longitudinal axis $L_1$ of the pedal base 12.

The pedal base 12 still further includes and defines a lower interior receptacle or opening or housing 53 extending into the interior of the body of the pedal base 12 from the lower exterior surface 18 of the pedal base 12. The interior receptacle or opening or housing 53 is located in a relationship diametrically opposed to and in communication with the receptacle or opening 29 in the top surface 16 of the pedal base 12.

The pedal arm 14 includes a top/upper longitudinally extending face or surface 30 and a bottom/lower longitudinally extending face or surface 32. The lower surface 32 includes an open elongated hinge clip bracket 34 extending unitarily outwardly therefrom and located at a first end of the pedal arm 14 and extending the full width of the pedal arm 14. The pedal arm 14 is hingedly and pivotally secured to the pedal base 12 in a relationship with the full length of the pedal arm 14 overlying, opposed, and spaced from the pedal base 12 with the bottom exterior face 32 of the pedal arm 14 facing and spaced from the top exterior face 16 of the pedal base 12 and the rod 19 of the pivot 17 extending and snapped into the interior of the clip bracket 34 and together defining a hinge type pivotal connection of the pedal arm 14 about and relative to the first end of the pedal base 12.

A clip arm 14a extends unitarily outwardly and downwardly from the lower exterior surface 32 of the pedal arm 14. The clip arm 14a is located at the second end of the pedal arm 14 opposite the first end of the pedal arm 14 with the clip 34. The clip arm 14a includes and defines a through-hole or opening 14c. The pedal arm 14 also includes a pair of spaced apart and parallel and generally cylindrical collars or projections 14d and 14e extending unitarily outwardly from the lower exterior surface 32.

The pedal arm 14 is further secured to the pedal base 12 in a relationship with the clip arm 14a snapped onto and secured to the clip bracket or finger 27b on the front wall portion 27a of the wall 27 of the collar 25 on the pedal base 12 and, more specifically, in a relationship with the clip bracket or finger 27b extending into the through-hole or opening 14c defined in the clip arm 14a.

Thus, the pedal arm 14 is pivotally secured to the pedal base 12 at respective first ends of the pedal arm 14 and the pedal base 12 and the pedal arm 14 is further clipped to the pedal base 12 at respective second ends of the pedal arm 14 and the pedal base 12.

Figure 1:
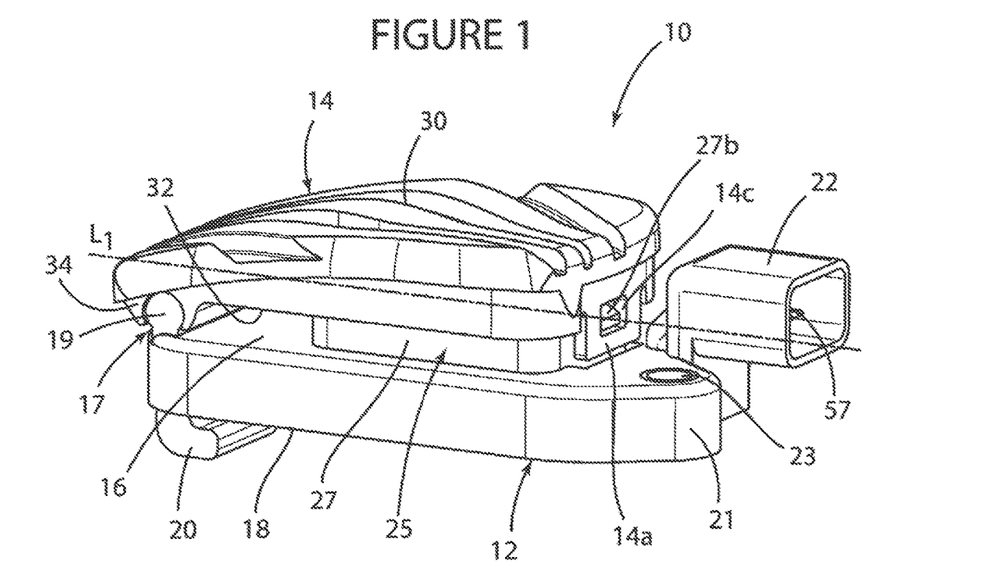
FIG. 1 is a perspective view of a compact vehicle pedal in accordance with the present invention.
Figure 2:
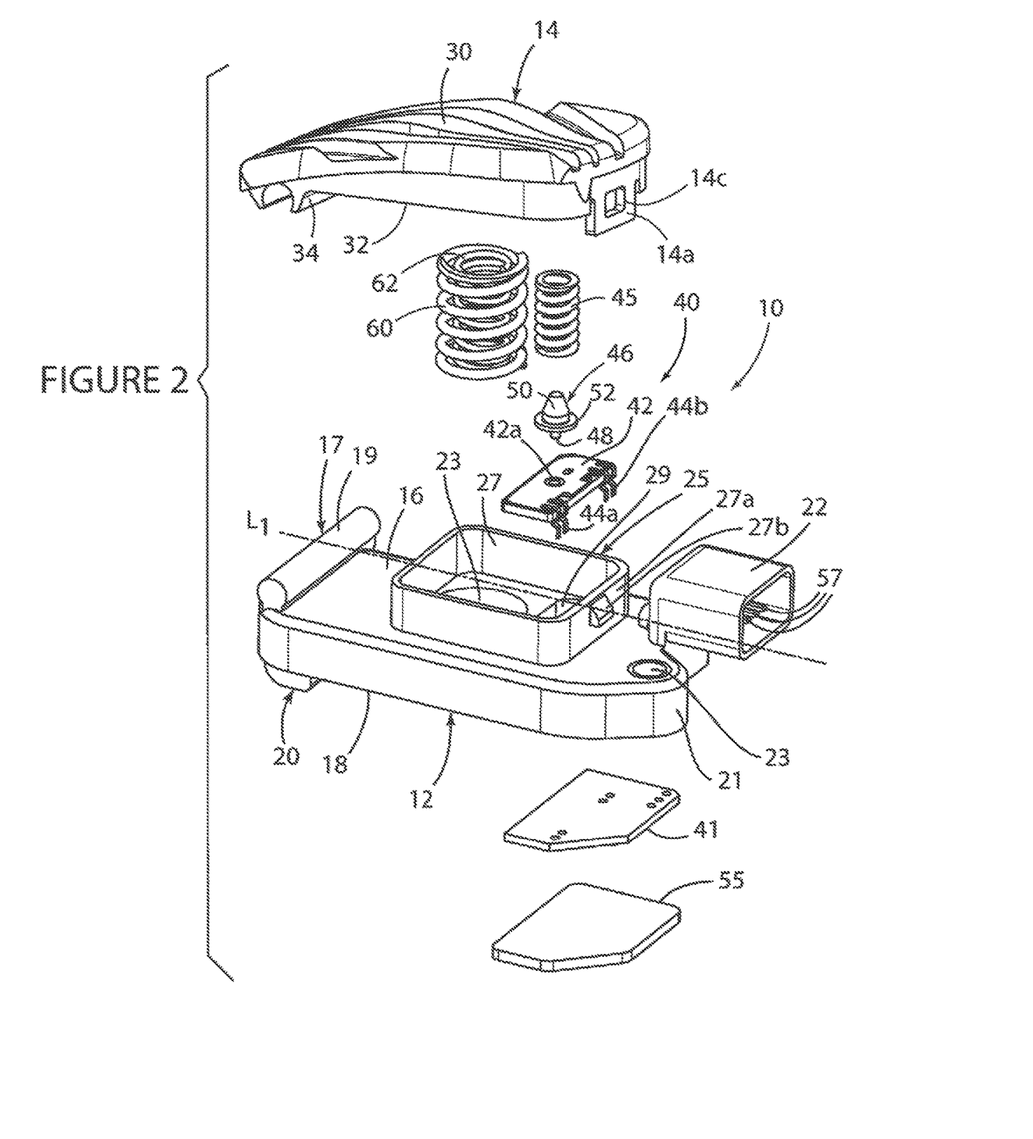
FIG. 2 is an exploded perspective view the compact vehicle pedal of FIG. 1.
Figure 3:
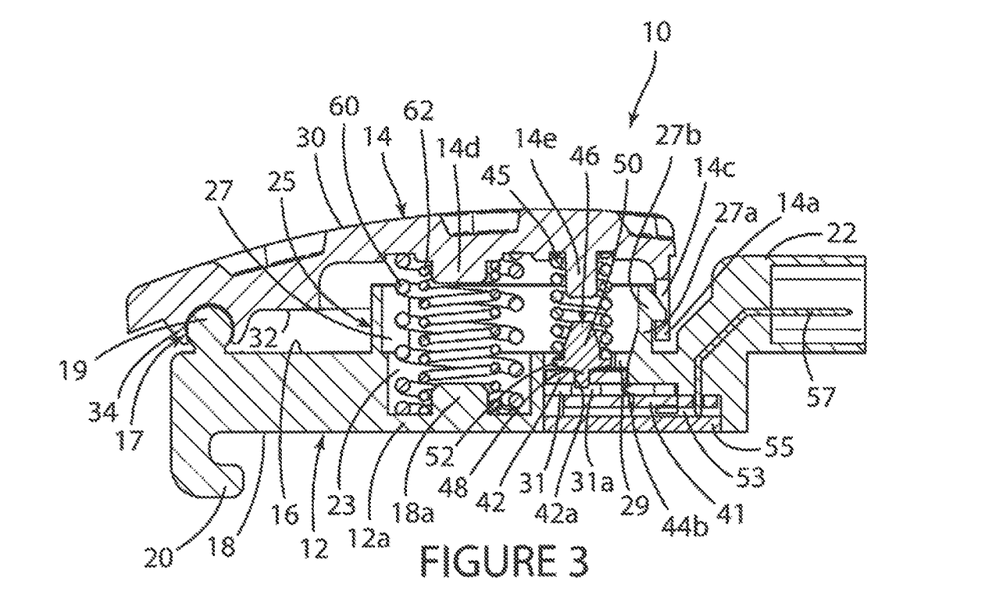
FIG. 3 is a vertical cross-sectional view the compact vehicle pedal of FIG. 1 in its idle position.
Figure 4:
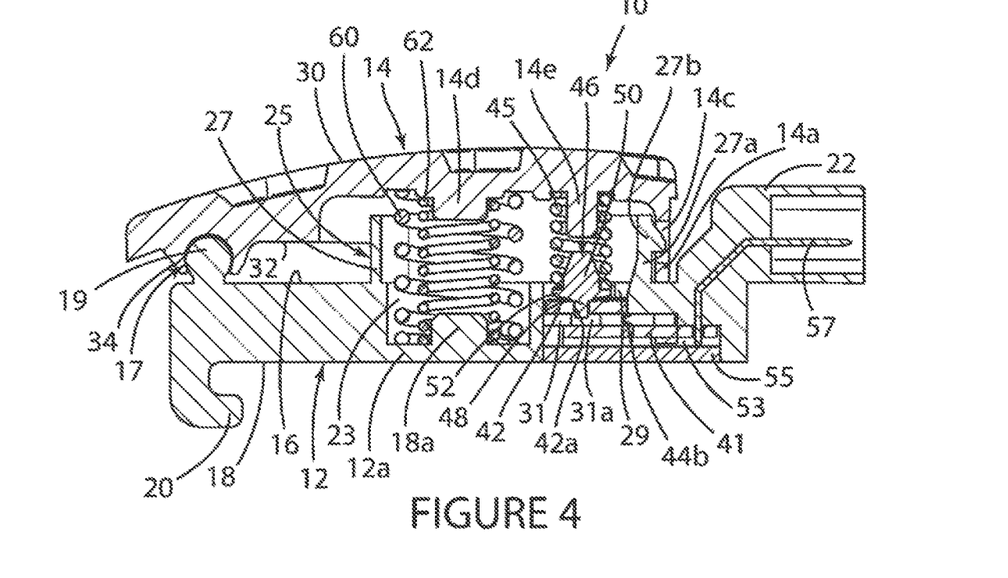
FIG. 4 is a vertical cross-sectional view of the compact vehicle pedal of FIG. 1 in its depressed and engaged position.

FIGS. 2, 3, and 4 depict the contacting strain gage sensor assembly 40 of the vehicle pedal 10. In the embodiment shown, the sensor assembly 40 includes a substrate/printed circuit board/PCB 41, a strain gage or beam 42 with electrically resistive strip elements or resistors (not shown due to the presence of an overcoat layer in FIG. 2) defined or mounted on one or both exterior surfaces of the beam 42 and arranged in a bridge circuit configuration as shown and described in for example U.S. Pat. No. 7,086,297, the entire disclosure and contents of which are incorporated herein by reference.

The strain gage or beam 42 further defines a generally centrally located through-hole or aperture 42a; a pair of pluralities of jumper terminals 44a and 44b coupled to and extending from the strain gage beam 42; a moveable sensor element in the form of a strain gage beam actuator 46; and a bias helical spring 45.

The PCB 41 is inserted and located in the interior of the pedal base 12 and, more specifically, is inserted and located in the interior housing 53 defined in the lower surface 18 of the pedal base 12 and extending generally horizontally in a relationship spaced and parallel to the pedal base exterior surfaces 16 and 18 and in the same direction as the longitudinal axis $L_1$ of the pedal 10/pedal base 12. On end of the electrical terminals 57 that extend through the electrical connector 22 are coupled to the PCB 41. A bottom cover 55 covers the lower receptacle 53 and protects the PCB 41.

The strain gage beam 42 is also inserted and located in the interior of the pedal base 12 and, more specifically, is inserted and located in the interior pedal base housing 29 in a relationship extending generally horizontally in a relationship spaced and parallel to the pedal base exterior surfaces 16 and 18 and in the same direction as the longitudinal axis $L_1$ of the pedal base 12 and the pedal 10 and, still more specifically, in a relationship abutting and seated against the upper exterior surface of the interior pedal base platform 31 and, still more specifically, in a relationship overlying the through-hole 31a defined in the interior pedal base wall or platform 31.

Thus, in the embodiment shown, the strain gage beam 42 and the PCB 41 are located in the pedal base 12 on opposite sides of the interior pedal base platform 31.

The strain gage actuator 46 includes a generally cone-shaped upper portion or head 60, a circumferential radial platform or shoulder 52 extending unitarily radially outwardly from the cone-shaped head 50, and a lower cylindrical projection or finger 48 extending unitarily outwardly and downwardly from the bottom end of the cone-shaped head 50.

The strain gage actuator 46 is inserted and located in the upper receptacle 29 defined in the interior of the pedal base 12 in a relationship extending normally to the longitudinal axis $L_1$ of the pedal 10/pedal base 12 and the strain gage beam 42 and, still more specifically, in a relationship with the projection 48 on the actuator 46 extending through the through-hole 42a defined in the strain gage beam 42 and the shoulder 52 of the strain gage actuator 46 abutting against the upper surface of the strain gage beam 42.

The bias spring 45 is located and mounted in the pedal 10 between and in a relationship generally normal to the pedal arm 14 and the pedal base 12 and the pedal 10/pedal base 12 longitudinal axis $L_1$ and, more specifically, in a relationship with a first end of the bias spring 45 surrounding the collar 14e and abutted against the lower exterior surface 32 of the pedal arm 14 and an opposite second end surrounding the head 50 and abutted against the radial shoulder 52 of the actuator 46.

The pedal 10 further comprises a pair of helical and telescoping pedal arm return springs 60 and 62 located in the pedal 10 between and in a relationship generally normal to the pedal arm 14 and the pedal base 12 and the pedal/pedal base longitudinal axis $L_1$ and, more specifically, in a relationship with a first end of the springs 60 and 62 surrounding the collar 14d and abutted against the lower exterior surface 32 of the pedal arm 14 and an opposite second end extending into the receptacle 23 defined in the top exterior surface 16 of the pedal base 12 and, still more specifically, in a relationship with the opposite second end surrounding the collar 18a and abutted against the interior pedal base platform 12a.

In another embodiment, the spring 45 may comprise a combination bias and return spring and the return springs 60 and 62 can be eliminated.

In accordance with the pedal 10 of FIGS. 1, 2, 3, and 4 and, as more particularly shown in FIGS. 3 and 4, the depression of the pedal arm 14 in the direction of the pedal base 12 from the FIG. 3 pedal arm idle (no acceleration/no braking) position to the FIG. 4 pedal arm depressed or engaged (acceleration/braking) position results in the compression of the bias spring 45 which causes the end of the bias spring 45 abutted against the shoulder 52 of the actuator 46 to exert a force against the shoulder 52 resulting in the movement of the actuator 46 in the direction of the pedal base 12 which in turn causes the shoulder 52 of the actuator 46 to exert a force against the surface of the strain gage beam 42 which in turn results in deflection or bending of the beam 42 which in turn results in a change in the electrically resistive characteristics of the electrically resistive elements or resistors (not shown) formed or mounted on one or both the exterior surfaces or inner surface of the beam 42 which change in resistance is transferred as an electrical signal to the PCB 41 via the jumper terminals 44b extending between the beam 42 and the PCB 41 and then to the connector terminals 57 extending from the PCB 41 and into and through the connector 22 and then to the vehicle controls (not shown) to allow the computation and measurement of the position of the pedal arm 14 of the pedal 10.

The helical pedal arm return springs 60 and 62, which are compressed during depression of the pedal arm 14, expand upon a user's removal of his/her foot from the pedal arm 14 to return the pedal arm 14 to its idle FIG. 3 position.

Thus, in the embodiment shown, the sensor assembly 40 and the return springs 60 and 62 are located and positioned in the longitudinal direction and axis $L_1$ of the pedal 10 between the first and second ends of the pedal base 12 and the pedal arm 14 with the spring 45 of the sensor assembly 40 located and positioned in a relationship generally parallel and spaced from the return springs 60 and 62. Moreover, in the longitudinal direction and axis $L_1$ of the pedal 10, the sensor assembly 40 is located and positioned in the pedal 10 between the springs 60 and 62 and the second ends of the pedal base 12 and the pedal arm 14.

In the direction normal to the longitudinal direction and axis $L_1$ of the pedal 10/pedal base 12, the sensor assembly 40 and the return springs 60 and 62 are located and positioned between the pedal base 12 and the pedal arm 14 with the spring 45 of the sensor assembly 40 and the return springs 60 and 62 located and positioned in a relationship generally normal to the pedal base 12 and the pedal arm 14.

Figure 5:
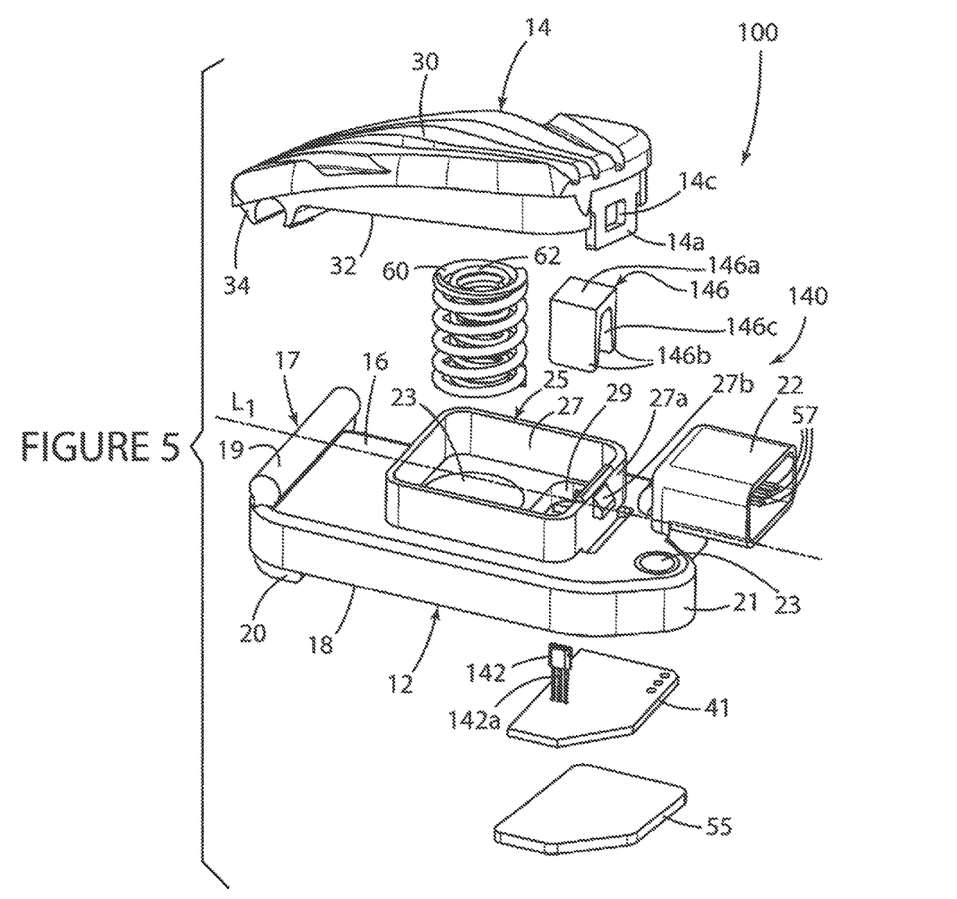
FIG. 5 is an exploded perspective view of another embodiment of a compact vehicle pedal in accordance with the present invention.
Figure 6:
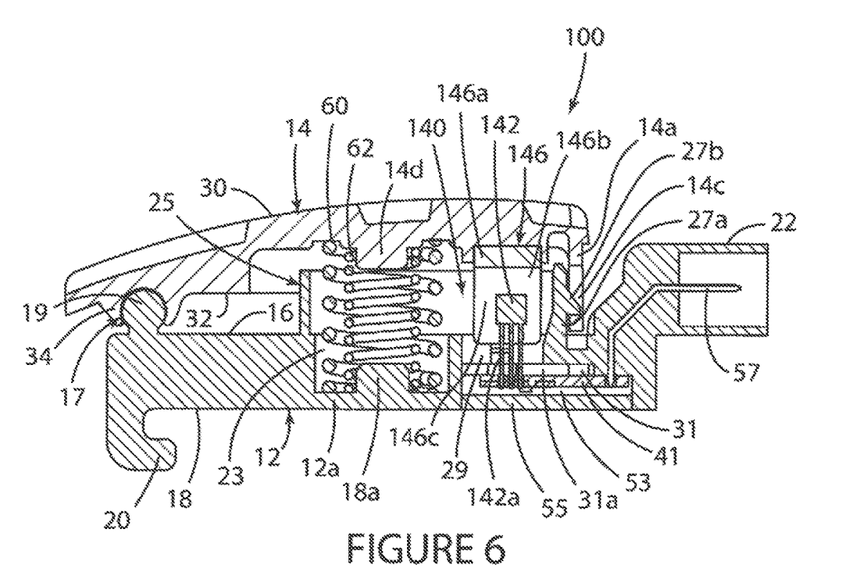
FIG. 6 is a vertical cross-sectional view of the compact vehicle pedal of FIG. 5 in its idle position.
Figure 7:
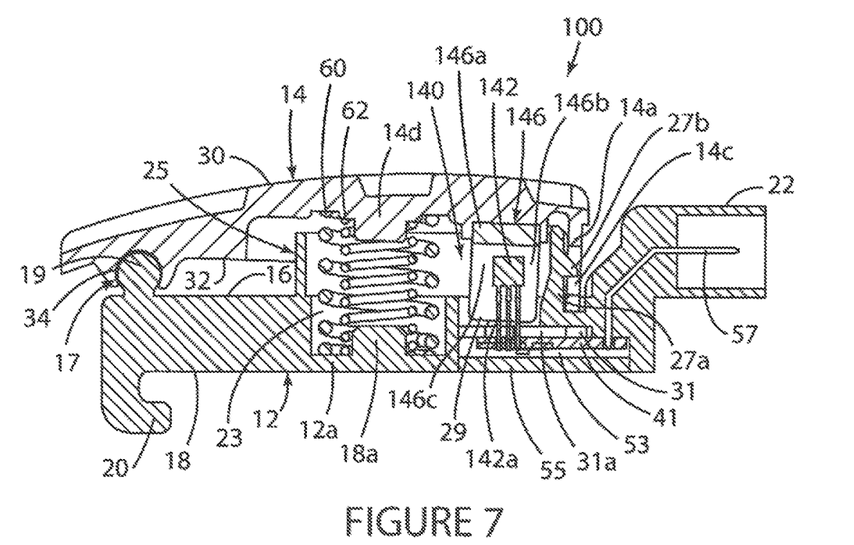
FIG. 7 is a vertical cross-sectional view of the compact vehicle pedal of FIG. 5 in its depressed and engaged position.

FIGS. 5, 6, and 7 depict a non-contacting sensor pedal embodiment 100 that is similar in structure and operation to the pedal 10, and thus the earner description of the structure and the operation of the elements in FIGS. 5, 6, and 7 with the same numerals as corresponding elements in FIGS. 1-4 for the pedal 10 is incorporated herein by reference with respect to the structure and operation of the pedal 100, except that the contacting sensor assembly 40 of the pedal 10 has been substituted and replaced with a non-contacting sensor assembly 140 as described in more detail below.

Specifically, the non-contacting sensor assembly 140, which is generally of the type disclosed in for example U.S. Pat. No. 6,515,473 the entire disclosure and contents of which is incorporated herein by reference, includes the substrate/printed circuit board/PCB 41, a Hall Effect sensor 142 with terminals 142a; and a moveable sensor element in the form of a generally C-shaped moveable magnet 146 including a base 146a and a pair of spaced apart and generally parallel magnet arms 146b which together define an interior magnet gap 146c.

The Hall Effect sensor 142 is inserted and located in the interior of the pedal base 12 and, more specifically, is inserted and located in the upper receptacle 29 defined in the upper surface 16 of the pedal base 12 in a relationship extending generally normal to the PCB 41, the pedal base 12, and the pedal arm 14, with the terminals 142a thereof extending generally normal to the PCB 41 and into and through the through-hole 31a defined in the interior pedal base platform 321 and into the upper exterior surface of the PCB 41.

The magnet 146 is mounted and located in the pedal 100 between the pedal arm 14 and the pedal base 12 in a relationship generally normal to the pedal arm 14, the pedal base 12, and pedal/pedal base longitudinal axis $L_1$, and more specifically, in a relationship with the base 146a of the magnet 146 retained or secured in the lower exterior surface 32 of the pedal arm 14 and the magnet arms 146b extending generally normal outwardly from the pedal arm 14 in the direction of the pedal base 12 and the Hall Effect sensor 142 located in the gap 146c defined between the arms 146b of the magnet 146.

In accordance with the operation of the pedal 110 shown in FIGS. 5, 6, and 7 and, more specifically referring to FIGS. 6 and 7, depression of the pedal arm 14 in the direction of the pedal base 12 from its idle (no acceleration/no braking) position as shown in FIG. 6 to its engaged (acceleration/braking) position as shown in FIG. 7 results in the downward movement of the magnet 146 in the direction of the pedal base 12 and relative to the stationary Hall Effect sensor 142 which results in a change in the magnitude and/or direction of the magnetic field generated by the magnet 146 which change in magnitude and/or direction is sensed by the Hall Effect sensor 142 which in turn is transferred as an electrical signal to the PCB 41 via the Hall Effect terminals 142a extending between the Hall Effect sensor 142 and the PCB 41 which in turn is transferred as an electrical signal to the vehicle controls (not shown) via the connector terminals 57 coupled to the PCB 41 and extending through the connector 22 to allow the computation and measurement of the position of the pedal arm 14.

Thus, in the embodiment shown, the sensor assembly 140 and the return springs 60 and 62 are located and positioned in the longitudinal direction and axis $L_1$ of the pedal 100 between the first and second ends of the pedal base and the pedal arm 14 with the sensor assembly 140 located and positioned in the pedal 10 between the springs 60 and 62 and the second ends of the pedal base 12 and the pedal arm 14 and further with the magnet 146 of the sensor assembly 140 and the return springs 60 and 62 located and positioned in a spaced apart and generally parallel relationship.

In the direction normal to the longitudinal direction and axis $L_1$ of the pedal 10/pedal base 12, the sensor assembly 140 and the return springs 60 and 62 are located and positioned between the pedal base 12 and the pedal arm 14 with the magnet 146 of the sensor assembly 140 and the return springs 60 and 6' located and positioned in a relationship generally normal to the pedal base 12 and the pedal arm 14.

Figure 8:
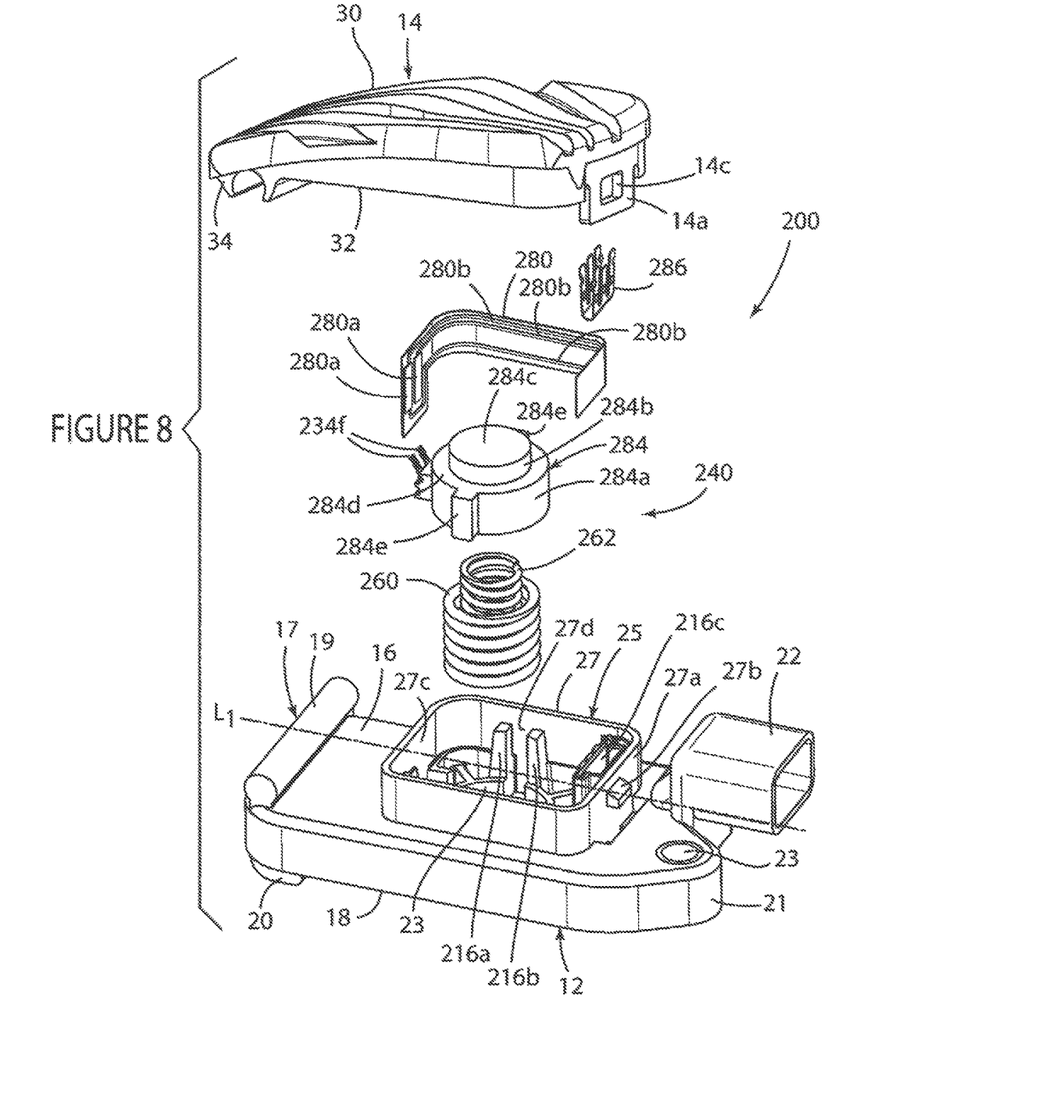
FIG. 8 is an exploded perspective view of a further embodiment of a compact vehicle pedal in accordance with the present invention.
Figure 9:
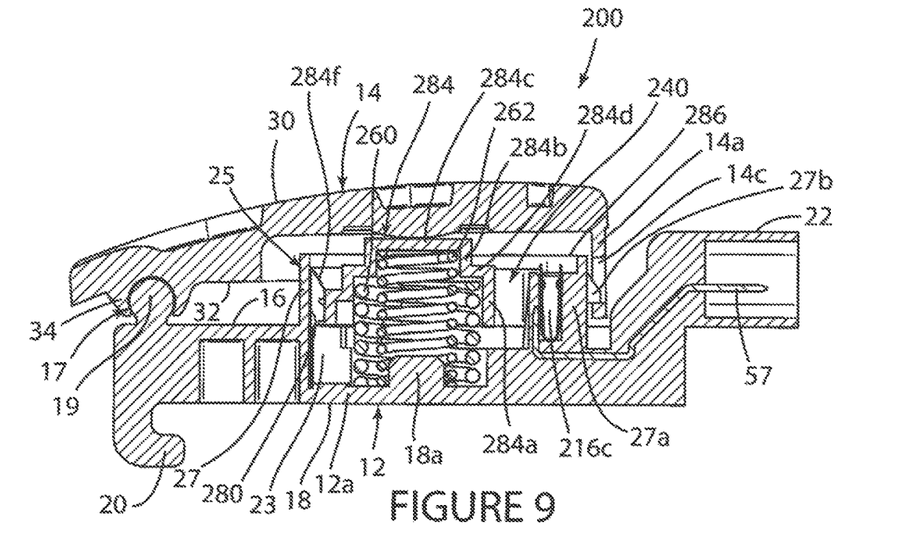
FIG. 9 is a vertical cross-sectional view of the compact vehicle pedal of FIG. 8 in its idle position.
Figure 10:
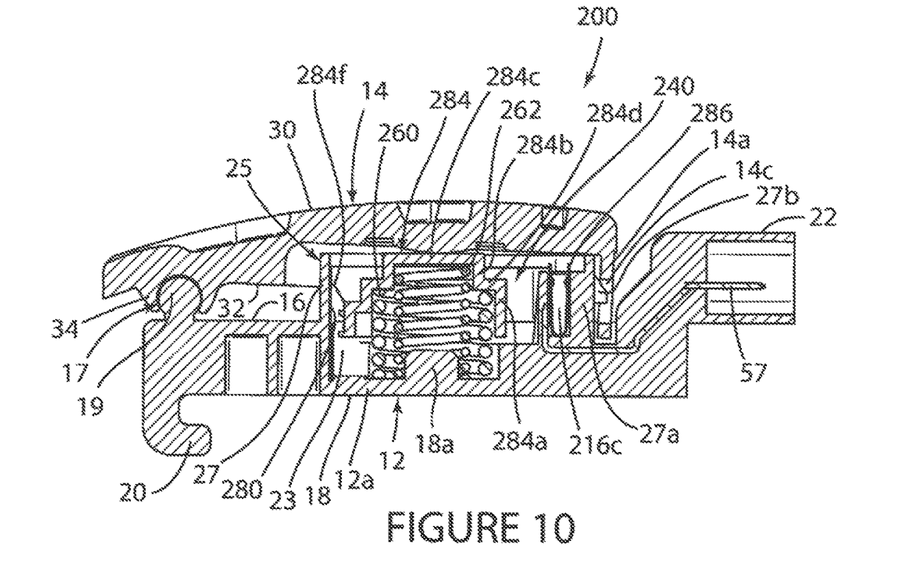
FIG. 10 is a vertical cross-sectional view of the compact vehicle pedal of FIG. 8 in its depressed and engaged position.

FIGS. 8, 9, and 10 depict another contacting sensor pedal 200, and more specifically a contacting resistive potentiometric sensor embodiment, that is similar in structure and operation to the pedals 10 and 100, and thus the earlier description of the structure and the operation of the elements thereof with the same numerals as corresponding elements in FIGS. 1-4 and 5-7 for the pedals 10 and 100 respectively is incorporated herein by reference with respect to the structure and operation of the pedal 200, except that the respective sensor assemblies 40 and 140 of the respective pedals 10 and 100 have been substituted and replaced with a contacting sensor assembly 240 as described in more detail below.

In the pedal 200, the pedal base 12 additionally includes a pair of pair of diametrically upstanding posts 216a and 216b extending unitarily generally normally outwardly from the pedal base 12. The posts 216a and 216b are located in the collar 25. The interior surface of the wall section 27a of the wall 27 of the collar 25 on the pedal base 12 additionally includes an interior wall defining an interior pocket 216c.

The contacting sensor assembly 240, which is generally of the contacting potentiometric type disclosed in for example U.S. Pat. No. 5,416,295, the disclosure and contents of which is incorporated herein by reference, includes a pair of combination bias and pedal arm return helical and telescoping springs 260 and 262; an elongated resistive element 280 including respective resistive pads 280a and associated electrical connection lines 280b formed on the exterior surface thereof; a moveable sensor element in the form of a moveable drive arm 284; and a resistive element clip 286.

The elongated resistive element 280 is inserted and located in the pedal base 12 in a relationship with respective portions thereof abutting against the interior of the respective wall sections 27a, 27c, and 27d of the wall 27 of the collar 25 on the pedal base 12.

The resistive contactor dip 286 is located inside the pocket 216c defined in the wall section 27a of the wall 27 of the collar 25 and is adapted to hold the resistive element 280 in abutting contact with the end of the terminals 57 extending through the connector 22 and into the pedal base 12.

The drive arm 284 is in the form of a hollow generally cylindrical cap including a base or base cylindrical wall 284a and a top or top cylindrical wall 284b including a closed top cap or ceiling 284c and having a diameter less than the diameter of the base 284a to define a radial shoulder 284d between the base 284a and the top 284c. A pair of diametrically opposed guide arms 284e and a pair of spaced apart and parallel contactor terminals or wipers 284f extend outwardly from the exterior surface of the base 284a with the contactor terminals 284e located between and spaced from the guide arms 284e.

The combination bias and return helical springs 260 and 262 are inserted and located in the pedal 200 between the pedal base 12 and the pedal arm 14 and more specifically are inserted and located inside the collar 25 and the interior of the receptacle 23 in a relationship generally normal to the base 12, the pedal arm 14 and the pedal longitudinal axis $L_1$ with the lower ends of the springs 280 and 282 surrounding the interior pedal base collar 18a and abutted against the interior pedal base platform 12a.

The drive arm or cap 284 is inserted and mounted in the pedal 200 between the pedal base 12 and the pedal arm 14 and more specifically is positioned in a relationship seated and abutted against the upper ends of the springs 260 and 262 and still more specifically in a relationship with the upper end of the spring 262 abutted against the interior surface of the top 284c of the cap 284 and the upper end of the spring 260 abutted against the interior surface of the shoulder 284d of the cap 284. The respective guide arms 284e on the cap 284 are wedged between the respective pairs of guide posts 216a and 216b on the pedal base 12.

In accordance with the embodiment of FIGS. 8, 9, and 10, and more specifically FIGS. 9 and 10, depression of the pedal arm 14 from its idle (no acceleration/no braking) position of FIG. 9 in the direction of the pedal base 12 and into its engaged (acceleration/braking) position of FIG. 10 causes the lower exterior surface 32 of the pedal arm 14 to exert a force against the drive arm or cap 284 which in turn causes the downward movement of the drive arm cap 284 in the direction of the pedal base 12 which in turn causes the contactor wipers 284f to slide against the respective pads 280a of the resistive element 280 which in turn causes a change in resistive value which in turn is transferred as an electrical signal to the connector terminals 57 in electrical abutting contact with the respective lines 280b of the resistive element 280 and then to the vehicle controls (not shown) to allow the computation and measurement of the position of the pedal arm 14.

Thus, in the embodiment shown, the sensor assembly 240 is located and positioned in the longitudinal direction and axis $L_1$ of the pedal 100 between the first and second ends of the pedal base 12 and the pedal arm 14. In the direction normal to the longitudinal direction and axis $L_1$ of the pedal 10/pedal base 12, the sensor assembly 240 and the return springs 260 and 262 are located and positioned between the pedal base 12 and the pedal arm 14 in a relationship generally normal to the pedal base 12 and the pedal arm 14.

Numerous variations and modifications of the embodiments described above may be effected without departing from the spirit and scope of the novel features of the invention. It is to be further understood that no limitations with respect to the embodiments illustrated herein are intended or should be inferred. It is, of course, intended to cover by the appended claims all such modifications as fall within the scope of the claims.

What is claimed is:

1. A vehicle pedal comprising:
   a pedal base including opposed first and second ends and defining a sensor housing;
   a pedal arm overlying and spaced from the pedal base and including opposed first and second ends, the first end of the pedal arm being coupled to the first end of the pedal base and the pedal arm being pivotable about and relative to the pedal base;
   a sensor assembly located in the sensor housing in the pedal base, the sensor assembly including a sensor element that is moveable in the direction of the pedal base in response to the pivotable movement of the pedal arm in the direction of the pedal base for determining the position of the pedal arm, the sensor assembly additionally comprising a strain gage located in the sensor housing in the pedal base, a moveable actuator defining the moveable sensor element, the actuator being located between the strain gage and the pedal arm and abutting against the strain gage, and a bias spring located between the actuator and the pedal arm, the bias spring including a first end abutting against the actuator and a second opposed end abutted against the pedal arm, wherein the pivotal movement of the pedal arm in the direction of the pedal base causes the bias spring to exert a force against the actuator which causes the flexing of the strain gage and the generation of an electrical signal for determining the position of the pedal arm; and
   a return spring having a first end abutted against the pedal arm and a second opposed end abutted against the pedal base and adapted for returning the pedal arm to an idle position, the return spring being located between and spaced from the first end of the pedal base and the sensor assembly and further being positioned in a relationship spaced and generally parallel to the bias spring.

2. The vehicle pedal of claim 1 wherein the actuator includes a radial shoulder, the first end of the spring surrounding the actuator and abutted against the radial shoulder and the radial shoulder abutted against the strain gage.

3. The vehicle pedal of claim 1 further comprising a circuit board located in the sensor housing in the pedal base and wherein first electrical terminals extend between the strain gage and the substrate and second electrical terminals extend between the substrate and an electrical connector.

4. The vehicle pedal of claim 1 wherein the actuator includes a projection extending into an aperture defined in the strain gage.

5. A vehicle pedal comprising:
   a pedal base including opposed first and second ends and defining a sensor housing;
   a pedal arm overlying and spaced from the pedal base and including opposed first and second ends, the first end of the pedal arm being coupled to the first end of the pedal base and the pedal arm being pivotable about and relative to the pedal base;
   a sensor assembly located in the sensor housing in the pedal base, the sensor assembly including a sensor element that is moveable in the direction of the pedal base in response to the pivotable movement of the pedal arm in the direction of the pedal base for determining the position of the pedal arm, the sensor assembly additionally comprising a Hall Effect sensor located in the sensor housing of the pedal base and a moveable magnet defining the moveable sensor element and coupled to the pedal arm wherein the pivotal movement of the pedal arm in the direction of the pedal base causes the movement of the magnet in the direction of the pedal base and a change in the magnitude and/or direction of the magnetic field generated by the magnet that is sensed by the Hall Effect sensor and adapted to generate an electrical signal for determining the position of the pedal arm; and a return spring having a first end abutted against an underside of the pedal arm and a second opposed end abutted against a top surface of the pedal base and adapted for returning the pedal arm to an idle position, the return spring being located between the first end of the pedal base and the magnet of the sensor assembly.

6. The vehicle pedal of claim 5 wherein the magnet includes a base and a pair of spaced apart arms together defining an interior gap in the magnet, the Hall Effect sensor extending in the gap in the magnet.

7. A vehicle pedal comprising:
a pedal base including opposed first and second ends and defining a sensor housing;
a pedal arm overlying and spaced from the pedal base and including opposed first and second ends, the first end of the pedal arm being coupled to the first end of the pedal base and the pedal arm being pivotable about and relative to the pedal base; and
a sensor assembly located in the sensor housing in the pedal base, the sensor assembly including a sensor element that is moveable in the direction of the pedal base in response to the pivotable movement of the pedal arm in the direction of the pedal base for determining the position of the pedal arm, the sensor assembly further comprising a resistive element located in the sensor housing in the pedal base, a bias spring extending between the pedal arm and the pedal base, and a moveable cap comprising the moveable sensor element, the moveable cap being seated against a first end of the bias spring and abutting against an underside of the pedal arm and including a wiper in abutting contact with the resistive element wherein the pivotal movement of the pedal arm in the direction of the pedal base causes the movement of the cap in the direction of the pedal base which causes the wiper to slide against the resistive element and generate an electrical signal for determining the position of the pedal arm.

8. A vehicle pedal comprising:
a pedal base defining a sensor housing, the pedal base including opposed first and second ends, an elongate rod unitary with and projecting outwardly from the first end of the pedal base and a connector at the second end of the pedal base, the sensor housing being located between and spaced from the first end of the pedal base and the connector;
a pedal arm opposed and spaced from the pedal base, the pedal arm including opposed first and second ends, a pedal arm clip element at the first end of the pedal arm that receives the elongate rod on the pedal base and is pivotable about and relative to the elongate rod on the pedal base for pivotally mounting the pedal arm for movement in the direction of the pedal base;
a sensor located in the sensor housing, the sensor including a sensor element that is moveable in the direction of the pedal base in response to the pivotal movement of the pedal arm in the direction of the pedal base; and
respective second pedal base and pedal arm clip elements at the respective second ends of the pedal base and the pedal arm for clipping the pedal arm to the pedal base at the respective second ends of the pedal base and the pedal arm opposite the first ends of the pedal base and the pedal arm with the elongate rod and the pedal arm clip element respectively.

* * * * *